March 2, 1954 E. F. JIRSA 2,670,713
CONTROLLABLE LIMIT MEANS FOR REGULATING
STROKES OF FLUID PRESSURE APPARATUS
Filed Oct. 6, 1948 2 Sheets-Sheet 1

INVENTOR.
E. F. JIRSA
ATTORNEYS

March 2, 1954
E. F. JIRSA
2,670,713
CONTROLLABLE LIMIT MEANS FOR REGULATING
STROKES OF FLUID PRESSURE APPARATUS
Filed Oct. 6, 1948
2 Sheets-Sheet 2
FIG.3
FIG.4
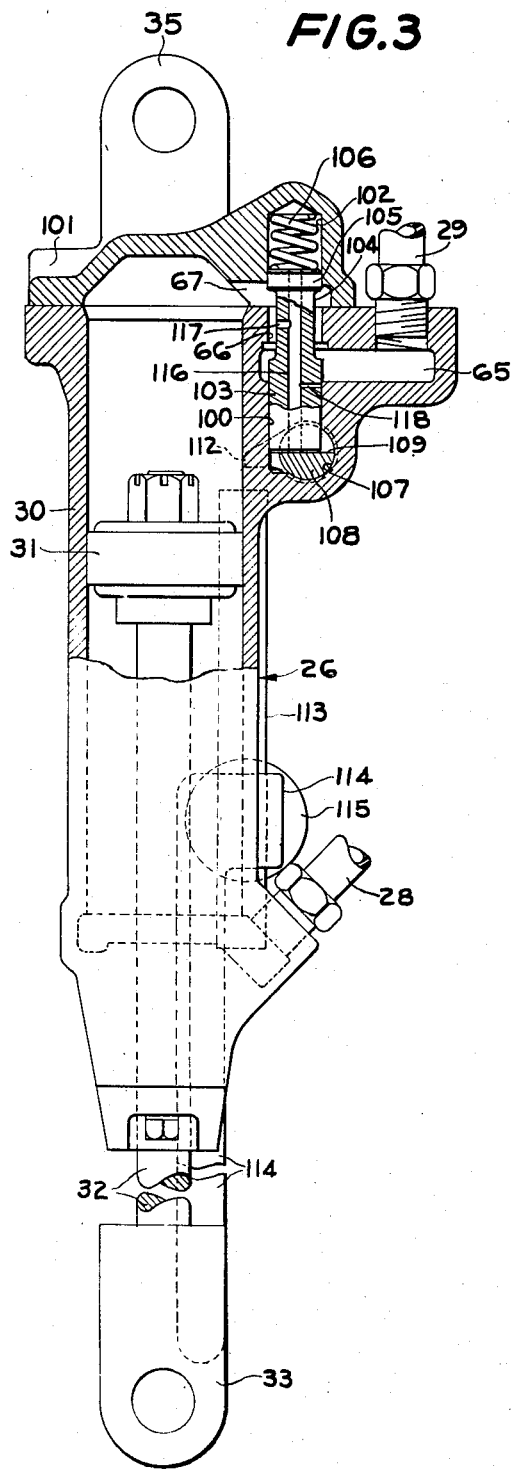
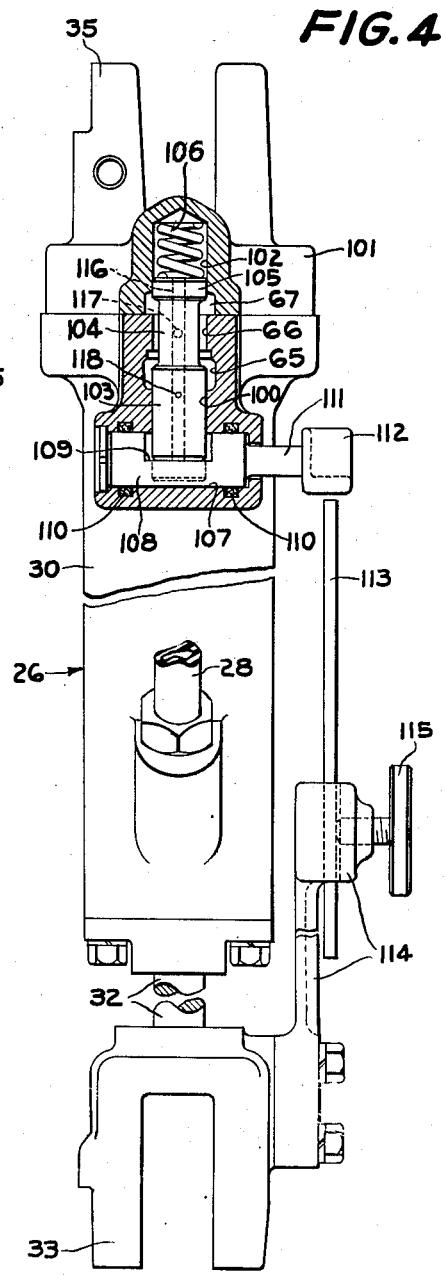
INVENTOR.
E.F. JIRSA
BY
ATTORNEYS Patented Mar. 2, 1954

2,670,713

UNITED STATES PATENT OFFICE 2,670,713

CONTROLLABLE LIMIT MEANS FOR REGULATING STROKES OF FLUID PRESSURE APPARATUS

Emil F. Jirsa, Waterloo, Iowa, assignor to Deere Manufacturing Co., Dubuque, Iowa, a corporation of Iowa Application October 6, 1948, Serial No. 53,066

8 Claims. (Cl. 121—38)

This invention relates to fluid-pressure apparatus and particularly to means for regulating or controlling the stroke of a fluid-pressure motor.

Although the principles of the invention are capable of application in many and divers fields, the preferred form of the invention to be detailed subsequently herein was designed primarily for utilization in the regulation or control of agricultural implements of that class comprising a vehicle or equivalent supporting frame having a source of power for driving a fluid-pressure pump or the like to supply fluid under pressure to a motor, such as a cylinder and piston assembly, which is in turn connected to an adjustable implement part, such as a plow or earthworking tool or the platform of a harvester or equivalent machine. In the case of a plow, for example, it is desirable to adjust the plow so that it will plow at a uniform depth. It is further desirable that the plow may be raised from its plowing or working position, as at the end of a furrow, and be readily returned to working position by lowering of the same to the selected uniform depth, as when beginning a new furrow.

In one particular system, this general result is efficiently and simply achieved by the use of a pair of cooperating stops or abutment members on the relatively movable motor parts, such as the cylinder and piston. The fluid-pressure system is provided with a relief valve which operates in response to an excess of pressure in the system to return a main control valve to neutral to discontinue the supply of fluid to the motor or the exhaust of fluid from the motor. These cooperating stops may be adjusted in accordance with the desired position of adjustment of the implement part, so that when the implement part reaches its desired position, one stop will engage the other and prevent further relative movement of the motor parts, bringing about a condition of excess pressure which will affect the main control valve to isolate the motor from the fluid-pressure source. A disadvantage noted in this system is that the stops are positive in action and the motor cannot be operated to adjust the implement part beyond the position selected; that is to say, the plow, for example, having once had its position determined by the cooperating stops, cannot be moved to a greater depth without a readjustment of the stops. In the case of a plow or analogous equipment, the implement part or equivalent adjustable part is remotely located with respect to the fluid-pressure source, since the latter is on the tractor or propelling vehicle and the adjustable part is connected behind the tractor, for example, on trailing supporting structure. Therefore, it is necessary in the system referred to above for the operator to dismount from the tractor to accomplish a readjustment of the cooperating stops.

According to the present invention, the above system is modified and improved to the extent that stop means is effective to accomplish a limit on the amount of relative movement of the motor part for the general purposes stated above. The cooperating parts of the stop means are adjustable so that any desired normal limit may be effected. However, the stop means further includes provision for additional movement beyond the range of movement of the motor parts determined by the original setting of the stops. This object is preferably achieved in a system in which the fluid-pressure apparatus has a main control valve capable of regulating the volume of fluid supplied to the motor so that the motor may be caused to operate at either a high or a low speed. The control valve has, of course, a neutral position in which the motor is isolated from the fluid-pressure source. The system further preferably includes a pressure-relief valve effective to return the control valve to its neutral position in response to any condition of excess pressure in the system. In operation, the stop means is set in a desired position of adjustment and the normal adjusted position of the implement is effected after predetermined relative movement of the motor parts, the system operating like that previously described to the extent that a condition of excess pressure is created to cause the main control valve to return to neutral. In the present case, however, should the operator desire to move the implement beyond its normal adjusted position, he may operate the system at low speed, an important feature of the invention residing in the provision of a valve in the stop means which has a throttling or by-pass means which establishes a restriction to operation of the system at high speed but which will permit operation of the system at low speed.

An important object of the invention is to adapt the general idea discussed above to a fluid-pressure system of an existing type. In this respect, it is an object of the invention to incorporate the stop means and valve as part of a conventional or standard fluid-pressure motor of the cylinder-piston type. Generally, the invention contemplates the provision of a simplified and easily controlled fluid-pressure system.

The foregoing and other important objects and desirable features inherent in and encompassed by the present invention will become apparent to those versed in the art as a preferred form of the invention is fully described and illustrated in the following detailed description and accompanying sheets of drawings in which:

Figure 3 is an enlarged side elevational view, partly in section, of the fluid-pressure motor as incorporating the improved stop means; and Figure 4 is a plan view, partly in section, of the arrangement shown in Figure 3.

Figure 1:
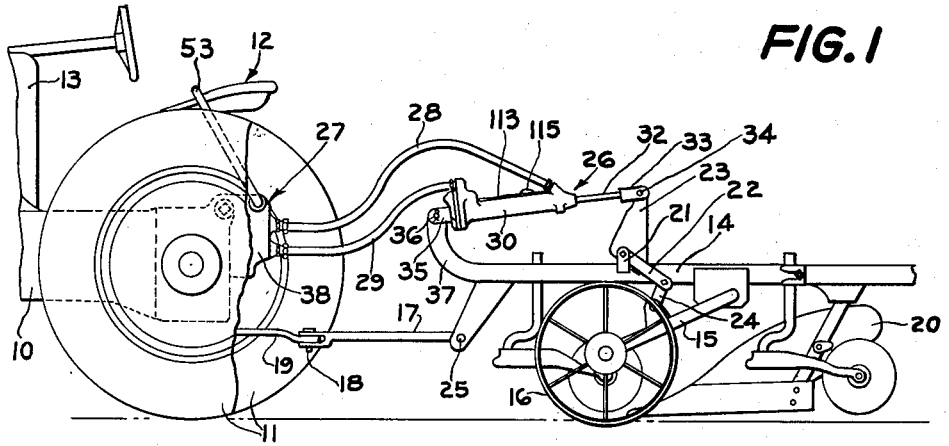
Figure 1 is a representative illustration of an implement arrangement to which the improved system may be applied.

The representative structure chosen for the purposes of illustration comprises, as shown in Figure 1, a tractor and a trailing implement. The tractor may be of any conventional construction and includes a longitudinal main body 10 carried on rear traction wheels 11 and provided with a rearwardly disposed operator's station 12 ahead of which is located an engine hood structure 13 within which is enclosed the usual power plant (not shown) for supplying power to the traction wheels 11.

The particular implement shown by way of illustration is a plow having a main frame 14 provided with a cranked axle 15 on which is journaled a ground wheel 16. The forward end of the frame 14 includes a draft member 17 which is pivotally connected at 18 to a conventional drawbar 19 on the tractor body 10. The ground-working tool is here represented by a plow bottom 20.

The plow frame or supporting structure 14 is provided just above the wheel 16 with a bearing 21 on which is pivoted a bell crank having first and second arms 22 and 23. The free end of the arm 22 is connected by a link 24 to the cranked axle 15. Rocking of the bell crank 22—23 in a clockwise direction, as viewed in Figure 1, will apply pressure through the link 24 to the axle 15 and will effect raising of the implement part comprising the frame 14 and plow bottom 20. The parts are shown in Figure 1 in substantially their uppermost positions. Rocking of the bell crank in a counterclockwise direction will result in a lowering of the parts 14 and 20. It will be understood that the connection of the hitch 17 to the frame 14 is accomplished in such manner as to provide for the necessary articulation of the frame 14 with respect to the hitch member 17, as by a pivot at 25. The general structure and arrangement of the tractor and implement are or may be conventional and resort need not be had to further detailed description thereof.

Adjustment of the plow bottom 20 between its raised position as shown and a lowered or ground-working position is accomplished by fluid-pressure apparatus comprising a fluid motor 26; means for controlling the supply of fluid under pressure to the motor, designated generally by the numeral 27 in Figure 1; and a fluid-pressure circuit including the components 26 and 27 and a pair of conduits 28 and 29.

The motor 26 comprises a cylinder 30 and a piston 31 (Figure 3). The cylinder 30 forms a chamber within which the piston 31 is reciprocable and the latter includes a piston rod 32 having at its free end a clevis 33 for attachment at 34 to the upper end of the bell crank arm 23. The closed end of the cylinder 30 has a clevis 35 connected at 36 to an upturned supporting portion 37 at the forward end of the implement frame 14. It will be seen that extension of the piston and piston rod with respect to the cylinder 30 will rock the bell crank 22—23 in a clockwise direction to raise the plow bottom and frame, and that retraction of the piston and piston rod will rock the bell crank in a counterclockwise direction to lower the plow bottom and frame.

Figure 2:
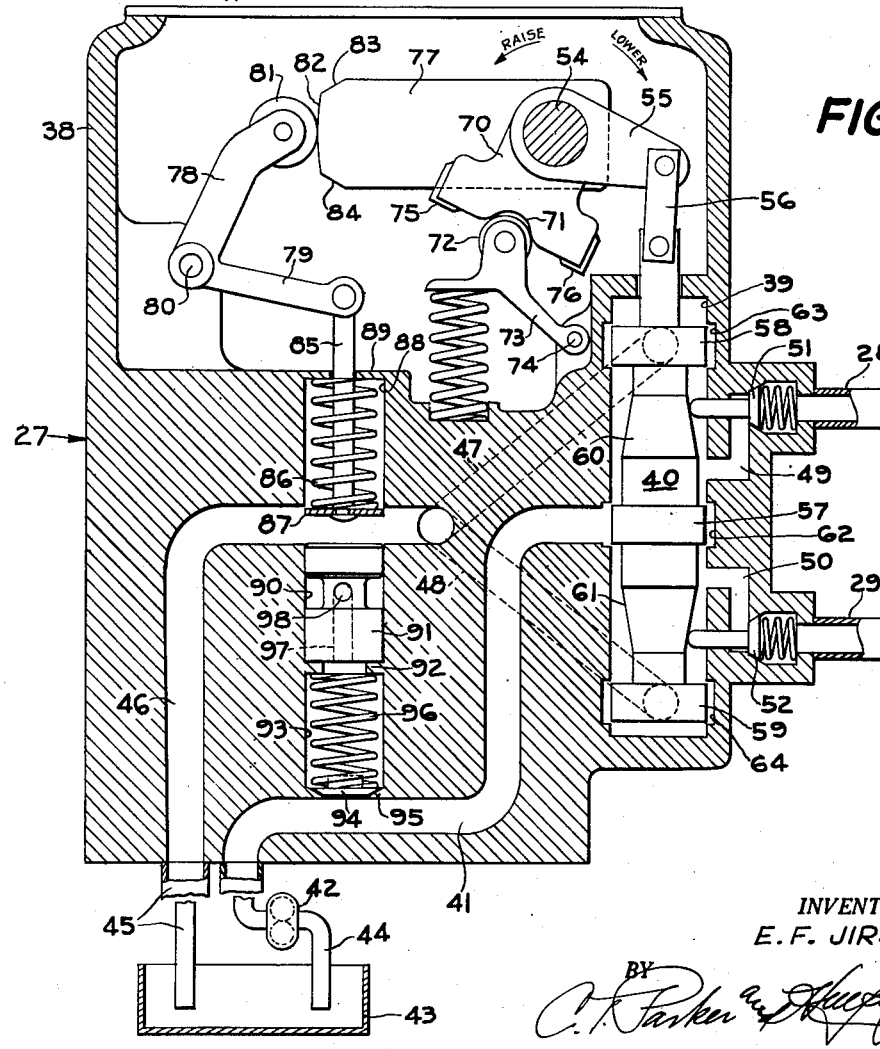
Figure 2 is an enlarged sectional view, somewhat schematic, of that portion of the fluid-pressure apparatus including the source of fluid pressure, the pressure-relief valve, and the main control valve.

The controlling and supplying means 27 is shown in Figure 2 as embodying typical construction in which the working parts are contained in a suitable housing 38 which may be secured to the rear portion of the tractor body 10 in any appropriate manner. The housing has a vertical valve cylinder 39, within which a valve piston 40 is axially shiftable, and a fluid-supply or high-pressure passage or conduit 41 connected at one end to a suitable source of supply, such as a pump 42 (illustrated schematically in Figure 2).

The high-pressure line 41 and pump 42 represent the high side of the system. The low side of the system includes a reservoir 43 to which the pump is connected as by an intake conduit 44. The reservoir 43 is connected by a return conduit 45 to an exhaust passage 46 in the housing 38. The passage 46 includes a pair of branches 47 and 48 connected at axially spaced points in communication with the valve cylinder 39. The fluid-pressure-transmitting conduits 28 and 29 are also connected to the valve cylinder 39 by means of a pair of passages or conduits 49 and 50, respectively. A spring-loaded check valve 51 controls the passage 49—28 and a similar check valve 52 controls the passage 50—29.

The valve 40 is shown in Figure 2 in its neutral position and both check valves 51 and 52 are closed; therefore, the fluid motor 26 is hydraulically locked and the implement part 14—20 will be maintained in its selected position. Regulation of the control valve 40 is effected by means of a control lever 53 carried by the housing 38 on a transverse rockshaft 54 and conveniently located with respect to the operator's station 12 (Figure 1). Within the housing 38, the rockshaft 54 has fixed thereto a crank arm 55 which is connected by a link 56 to the upper end of the valve 40. Rocking of the control lever 53 in either direction will result in axial shifting of the valve 40 in the valve cylinder 39.

The valve 40, as illustrated, is of the spool type and is so constructed that in its neutral position, as shown, fluid supplied by the pump 42 through the passage 41 will circulate axially in opposite directions from the central portion of the valve cylinder 39 to end portions of the cylinder 39 for return through the exhaust branches 47 and 48 and thence through the exhaust passage 46 and return duct 45 to the reservoir 43. It will be understood, of course, that the pump 42 is operated by any suitable means on the tractor.

For the purposes of effecting the desired control of the fluid-pressure system, the valve 40 includes a central cylindrical portion 57, and upper and lower cylindrical portions 58 and 59 respectively. Intermediate the portions 57 and 58, the valve 40 is provided with a tapered section 60, and a similar tapered section 61 is provided intermediate the portions 57 and 59. The valve cylinder 39 is of substantially uniform diameter throughout its length except for annular recesses 62, 63 and 64. These recesses corresponding in position respectively with the high-pressure passage 41 and exhaust branches 47 and 48. In the neutral position of the valve 40, as shown in Figure 2, the tapered portions 60 and 61 are located as illustrated with respect to the check valves 51 and 52, respectively.

Operation of the system to the extent described is as follows: The control lever 53 may be moved a maximum distance forwardly, or in a counterclockwise direction, to effect maximum upward shifting of the valve 40. The result is that the cylindrical portion 57 of the valve cuts off the supply of fluid upwardly through the valve cylinder and directs the fluid downwardly to the check valve 52. The pressure rise in this portion of the system causes the check valve 52 to open and fluid is supplied under pressure through the passage 50 to the lower conduit 29 which, in turn, supplies fluid under pressure to the closed end of the cylinder through a conduit or passage comprising communicating ducts 65, 66 and 67 (Figure 3). Ignoring for the moment the detailed structure of the cylinder 30, it will be seen that the result is to extend the piston rod 32 with respect to the cylinder and thus to raise the implement to the position shown in Figure 1.

Simultaneously with the raising of the valve 40, as aforesaid, the tapered portion 60 engages the stem of the upper check valve 51 and causes this valve to open to its maximum extent against its loading spring, thereby establishing communication between the upper conduit 28 and upper passage 49 and providing for the exhaust of fluid at its maximum rate of flow from the rod end of the cylinder past the upper portion of the valve 40 and into the exhaust branch 47 and thence through the passages 46 and 45 to the reservoir 43. Return of the control lever 52 to its neutral position effects hydraulic locking of the motor 26 as stated above.

Rocking of the lever 53 a maximum distance in a clockwise direction, or to the rear, as viewed in Figure 1, reverses the procedure just described and the motor 26 may be contracted to effect lowering of the implement part.

The control means 27 presently illustrated includes means for controlling the volume of fluid under pressure to the motor 26 to effect either high-speed or low-speed operation of the motor. This means includes the valve 40 and the parts just described, together with means for indicating to the operator certain positions of the valve in which the system may be caused to operate at either of the speeds referred to. For this purpose, the control lever rockshaft 54 carries fixedly thereon within the housing 38 a plate 70 which is centrally notched at 71 to normally receive a roller 72 which forms part of a spring-loaded arm 73 that is pivoted to an interior portion of the housing 38, as at 74. Opposite portions of the plate member 70 that border the notch 71 are substantially straight but terminate in lugs 75 and 76, respectively. This arrangement provides that the operator, when moving the control lever forwardly, for example, may, at an intermediate point in the range of movement, feel first the disengagement of the roller 72 from the notch 71 and then the engagement of the roller with the lug 75. At this point, the valve 40 will be only partly shifted upwardly in the valve cylinder 39 and a smaller volume of fluid will be supplied as compared with the volume of fluid supplied when the valve 40 is fully opened, since partial shifting of the valve 40 results in only partial opening or cracking of the valve 51, thus metering, or reducing the rate of flow of, fluid exhausted from the motor through the conduit 28. Although the pressure in the system will actually open the lower valve 52 to its maximum, metering as aforesaid at the valve 51 will result in diversion of part of the fluid on the high side back to the reservoir through the pressure-relief means described below. Various types of metering valves may be used in place of the check valves 51 and 52, as in United States Patent 2,532,552, but, since the present system is shown only diagrammatically, the detailed structure has been omitted.

In the event that the operator desires to effect a relatively fine adjustment of his implement, he will utilize this slow speed. He can, of course, move the control lever past the point at which he feels engagement between the roller 72 and lug 75 to obtain high-speed operation. A similar result may be obtained by movement of the lever 53 in the opposite direction.

The control system illustrated has means for automatically returning the control valve 40 to neutral in response to excess pressure in the system. Part of this means includes an arm 77 fixed to the rockshaft 54 and associated with a bell crank having arms 78 and 79. This bell crank is pivoted at 80 to the interior of the housing 38. The arm 78 carries a roller 81 which rides on an arcuate portion 82 of the arm 77. This portion is formed about the axis of the rockshaft 54 and terminates at its opposite ends in cut-off corners 83 and 84 respectively. The bell crank 78—79 is spring-loaded by means including a rod 85, a compression spring 86, and a washer 87. A portion of the housing 38 is bored at 88 to accommodate the spring 86. The rod 85 is connected at one end to the arm 79 and is headed at its other end to carry the washer 87. The spring 86 is confined between the washer 87 and a wall 89 which forms the end of the bore 88. The action of the spring is such as to keep the roller 81 in constant engagement with the arcuate portion 82 or either of the corners 83 and 84, as the case may be.

The extent of the arc 82 is proportional to the range of movement of the control lever 53 in effecting slow-speed operation of the system in either direction. Hence, when the operator releases the control lever 53 the spring-loaded lever or arm 73 will be effective to return it to neutral from either of its slow-speed positions, inasmuch as the corners 83 and 84 on the plate 77 do not, in this range of movement of the lever 53, cooperate with the roller 81 to establish a lock on the rockshaft 54. Also, operation of the relief valve as an adjunct to metering, as stated above, will not affect the control lever, since the lever is not locked but will be held by the operator in either slow-speed position. However, when the control lever is moved to its maximum or high-speed position in either direction, the roller 81 engages with one or the other of the corners 83 or 84 and acts to hold the control lever 53 in either maximum position. The operator may, of course, overcome the locking action at will and move the control lever 53 to any intermediate position.

The housing 38 has a bore 90 below the bore 88 and both bores open to the return passage 46. A valve 91 is slidable in the bore 90 and normally rests on an annular apertured wall 92 which separates the bore 90 from a coaxial bore 93. Communication between the passage 41 and the bore 93 is controlled by a relief valve 94, normally held on a valve seat 95 by means of a relatively heavy compression spring 96. The spring 96 is calibrated to hold the valve 94 seated during operation of the system at normal pressures.

In the event of abnormal rise of pressure in the system, the valve 94 will open against the spring 96 and fluid from the high-pressure passage 41 will enter the bore 93, pass through the apertured wall 92 and raise the valve member 91 in the bore 90. Upward movement of the valve member 91 is followed by engagement of this valve member with the headed end of the rod 85, thus compressing the spring 86 and rocking the bell crank 78—79 in a counterclockwise direction to release the roller 81 from one or the other of the corners 83 or 84 on the plate 77. Upon release of the roller from the plate, the spring-loaded arm or lever 73 causes the rockshaft 54 and plate 70 to move angularly until the roller 72 again seats in the arcuate notch 71, which position determines the neutral position of the valve 40. Pressure relief valves of this type and for the purpose described are well known and any conventional construction may be substituted for that illustrated. Excess fluid pressure that causes upward movement of the valve member 91 and unlocking of the bell crank 78—79 is returned to the reservoir through the passages 45 and 46 by means of a pair of intersecting bores 97 and 98 in the valve member 91. It will be understood, of course, that when the valve member 91 raises, the bore 98 will communicate with the horizontal portion of the return conduit 46.

In systems of the type heretofore known, an excellent example of which is disclosed and claimed in U. S. Patent 2,442,306, issued to McCormick, the pressure-relief means is utilized in connection with adjustable stop means between the piston and piston rod for deliberately creating a condition in which stop means elements may interengage at a selected point to limit travel of the piston rod with respect to the cylinder, thereby causing the pressure-relief means to return the control valve to neutral. Such arrangement, as aforesaid, is desirable in returning a plow, for example, to working position after it has been raised. In the use of a system of the type referred to, the operator is relieved of the burden of re-determining the ground-working position of his implement upon lowering of the implement from a raised position. These characteristics are, of course, present in other situations, as in a harvester, for example, in connection with the raising and lowering of the harvester platform; although, the operations may be in reverse order.

One characteristic of the system described generally above is that the stops are positive; that is, once set, the stops must be readjusted manually in the event that the operator desires to adjust the implement to a position of increased depth, for example, beyond that determined by the stops. Then, he must again readjust the stops to secure his original adjustment, all of which requires that the operator dismount from the tractor.

According to the present invention, there is provided stop means including provision whereby the stops or their equivalent may be controlled by the operator through the medium of the control lever 53; therefore, the operator need not dismount from the tractor. At the same time, the stop means is so arranged as to retain the original adjustment even though allowing for variations in this adjustment from time to time. The manner in which these desirable results are achieved in the preferred form of the invention illustrated will be described below.

As previously described, the closed end of the cylinder 30 has the communicating passages 65, 66 and 67, the fluid-pressure-transmitting conduit or hose 29 being connected to the cylinder via the passage 65. The passage 66 is part of a bore that intersects the passage 65; a coaxial portion of this bore being designated at 100. The end of the cylinder that has the mounting clevis 35 includes a cap 101 within which is a bore 102 coaxial with the bore portions 66 and 100. The bore 66—100—102 carries slidably therein a valve member 103. This valve member is reduced at 104, to establish normal communication between the passage portions 65, 66 and 67, and is headed at 105 to effect a bearing in the bore 102. Yieldable means in the form of a coiled compression spring 106 biases the valve 103 to its normal position, as illustrated, so that fluid under pressure may be supplied through the conduit 29 or, alternatively, fluid may be exhausted from the closed end of the cylinder through the passages 67, 66 and 65 and conduit 29, depending upon which direction the piston is moved in the cylinder 30.

A transverse bore 107 intersects the bore 100 and rotatably carries an actuating member 108. This member is cylindrical except for a notch 109 which provides a flat disposed in abutting relation with the end of the valve 103.

The rockable member 108 may be appropriately sealed at 110 in the bore 107 and includes a reduced external shank 111 to which is fixed a depending actuating arm 112. This arm is disposed at one side of the cylinder 30 and cooperates with an adjustable stop or limit member 113 rigidly carried by a bracket 114 rigidly carried by the clevis 33 of the piston rod 32 (Figure 4). The member 113 is slidable through the bracket 114 but is selectively or adjustably positionable with respect to the bracket by means of a threaded securing element such as a hand nut 115. Relative movement of the motor part comprising the piston 31 with respect to the motor part comprising the cylinder 30 may be selectively determined or limited by engagement of the member 113 with the lever or arm 112 on the rockable member 108; and the position of engagement between the members 113 and 112 may be determined by adjusting the member 113 in the bracket 114. When the piston 31 is moving toward the closed end of the cylinder 30, the member 113 will move toward the arm 112 on the actuating member 108. Engagement of the member 113 with the arm 112 rocks the actuating member 108 in a clockwise direction, as viewed in Figure 3, and the flat formed by the notch 109 acts as a cam to displace the valve 103 against the biasing means or spring 106. The valve 103 is thus caused to close the bore 66 and discontinue communication between the passage portions 65 and 67, whereupon a condition of excess pressure is created in the system which effects operation of the pressure-relief valve 94 so that the bell crank 78—79 is rocked in a counterclockwise direction to relieve its locking effect on the plate 77; and the control valve 40 returns to neutral under the action of the spring-loaded arm 73.

To the extent described, the present system is generally similar to that disclosed in the patent to McCormick mentioned above. However, the improvement incorporated in the present system permits increased flexibility of the fluid-pressure apparatus. To this end, the valve 103 has an axial bore 116 and a pair of transverse smaller bores or orifices 117 and 118, each of which intersects or is in communication with the axial bore 116. When the valve 103 is in its normal position, as illustrated in Figures 3 and 4, the orifice or passage 117 is within the bore 66 and the orifice or passage 118 is within the bore 100. When the valve 103 is shifted to its closed position, or upwardly in Figures 3 and 4, the orifice 118 is within the passage 65 and the orifice 117 is within the passage 67. Thus, communication is established between the chamber of the cylinder 30 and the conduit 29 via the passage 67, orifice 117, bore 116, orifice 118 and passage portion 65.

Assuming now that the operator has moved the control lever 53 to its maximum position rearwardly to effect high-speed lowering of the implement, fluid under pressure from the high-pressure passage 41 in the housing 38 will be conducted through the passage 49 and conduit 28 to the rod-end of the cylinder and fluid from the closed end of the cylinder will return to the reservoir 43. When the motor parts 30 and 31 have moved relatively to the extent determined by adjustment of the stop member 113, the member 113 effects actuation of the member 108 to shift the valve 103. The restriction then set up by the throttling or by-pass orifices 117 and 118 and bore 116 is such as to prevent further operation of the system at high speed and thereupon the pressure-relief means operates to return the control valve to neutral, thus stopping relative movement between the motor parts and hydraulically locking the implement in its desired position of adjustment.

If the operator is satisfied that his selected adjustment is appropriate, he does nothing more with respect to the control lever 53 or the adjustment of the motor and continues to operate until the end of the furrow is reached or until some other condition arises which requires adjustment of the implement. The valve 103, being closed, interrupts communication between the circuit portions including the conduit 29 and the chamber in the cylinder 30, except for the restricted by-pass established by the ports or orifices 116—117—118; and, when the operator desires to raise the implement, he moves the control lever 53 forwardly so that fluid pressure is transmitted through the conduit 29 and throttling by-pass to an extent sufficient to move the piston 31 outwardly in the cylinder so that the member 113 shortly becomes disengaged from the arm 112 on the rotatable member 108, whereupon the spring 106 will fully open the valve 103 and continued raising of the implement may be effected.

In the event that the operator, after lowering the implement, desires to increase the working depth of the implement, he may do so, notwithstanding that the stop means has already operated to return the control valve 40 to neutral, by moving the control lever 53 rearwardly to its slow-speed position, for example, which position he can determine by feeling initial engagement of the roller 72 with the lug 76 on the plate 70. Or, he may move the lever fully to its high-speed position and hold it there against its tendency to return to neutral because of the excess pressure condition created by the throttling at 116—117—118. In the first case, a smaller rate of flow is permitted by the partial opening of the check valves 51 and 52, and in the second case the maximum pressure allowed by the relief valve will still be available in the high-pressure side of the system. In either case, the system will operate at slow speed, and the piston 31 is capable of forcing fluid through the throttling by-pass in the valve 103. It will be seen from Figure 3 that engagement of the end of the member 113 with the arm 112 effects clockwise angular movement of the arm, whereby the member 113 may ultimately pass under the arm so that further movement of the piston 31 toward the end 35 of the cylinder may be had. Thus, the operator may obtain adjustment beyond that normally determined by the stop means. Such temporarily selected adjustment does not affect the setting of the stop means and thereafter he may operate the system to secure lowering of the implement to the uniform depth originally selected.

The valve 103 and associated stop means may be repositioned to obtain the same result in connection with extension of the fluid motor for use with other implements, as a harvester, for example. In either case, the most desirable application of the invention is in connection with a system in which the control valve is automatically returned to neutral. However, the valve may be applied to other systems. If used in a system without an automatic return for the control valve, for example, the operator will realize that a condition of abnormal pressure exists and he himself will return the control valve to neutral, since in most systems having pressure-relief valves, there is an audible chattering of the valve which serves as a signal to the operator.

Other objects and features of the invention not specifically enumerated above will undoubtedly occur to those versed in the art, as will numerous modifications and alterations in the preferred construction illustrated, all of which may be achieved without departing from the spirit and scope of the invention as defined in the appended claims.

What is claimed is:

1. For an implement of the type including a supporting part and an implement part connected thereto for movement with respect thereto in at least one direction: fluid pressure apparatus comprising a fluid motor having first and second parts connectible respectively to the implement and supporting parts and arranged for movement of one relative to the other in at least one direction to move the implement part as aforesaid; a source of fluid pressure; a fluid-pressure circuit interconnecting and including said source and the motor for the transmission of fluid between the motor and said source; a selectively positionable control valve in the circuit having a neutral position to render the circuit ineffective for the transmission of fluid between the source and the motor, and further having high- and low-speed positions for selectively effecting the transmission of fluid respectively at relatively high or low rates of flow between the source and the motor for selectively effecting relative high- or low-speed movement of one motor part with respect to the other in said direction; means including a second valve in the circuit actuatable from a first position, in which adjoining portions of the circuit are relatively freely in communication so that the circuit is effective to transmit fluid at said relatively high rate when the control valve is in its high-speed position, to a second position in which communication between said adjoining circuit portions is restricted to such an extent that the circuit is incapable of transmitting fluid at said high rate; actuating means operative in response to a predetermined extent of high-speed movement of said one motor part relative to said other part in the aforesaid direction for actuating said second valve to its second position and hence to interrupt said high-speed movement; means operative in response to said interruption of movement for returning the control valve to its neutral position; means operative in response to the condition including actuation of said second valve to its second position for establishing between said adjoining circuit portions a communication rendering said circuit capable of carrying fluid at said relatively low rate when the control valve is moved to its low-speed position, so that relative movement of the aforesaid parts may be continued in said direction at said relatively low speed; and said actuating means including cooperating elements having provision for overrunning after actuation of the second valve means to its second position so that continued low-speed operation of the motor may be had without affecting said second valve.

2. For an implement having a supporting part and a movable part connected to the supporting part for movement with respect to the latter in a predetermined range in one direction and for return movement in another direction, the combination of two-way fluid-pressure means connectible between said parts and including control means for regulating the fluid-pressure means to hold said parts against relative movement and selectively operative to move said movable part in either direction at either a high or a low rate of speed; limit means, connected between the fluid-pressure means and one of said parts, and operative in response to movement of said movable part in one direction at high speed to a predetermined point in its range, for actuating the control means to condition the fluid-pressure means for holding said movable part against further movement in either direction; and means connected to said limit means and to the fluid-pressure means and operative in response to the aforesaid operation of said limit means to condition the fluid-pressure means for further operation at only said low rate of speed either to move said second part in said direction beyond said predetermined point or to return said part in said other direction.

3. For an implement of the type including a supporting part and an implement part connected thereto for movement with respect thereto in at least one direction: fluid-pressure apparatus comprising a fluid motor having first and second parts provided with means for connection respectively to the implement and supporting parts and arranged for movement of one relative to the other in at least one direction to move the implement part as aforesaid; a source of fluid pressure having high and low sides; a fluid-pressure circuit connected to and including the fluid-pressure source and the motor for transmitting fluid pressure between the motor and the source; a control valve in the circuit selectively movable to a neutral position to cut out the circuit between the source and the motor or to an active position for establishing the circuit; pressure-responsive means in the circuit operative in response to abnormal fluid pressure in the circuit for diverting the fluid pressure to the low side of the fluid-pressure source; means connected between the pressure-responsive means and the control valve for returning the control valve from its active position to its neutral position in response to actuation of said pressure-responsive means; means in the circuit including a second valve and a restricted passage controlled by said second valve, said second valve being actuatable from a first position opening the circuit for the supply of fluid to the motor at normal pressures, to a second position closing said circuit except for fluid-pressure transmission through said restricted passage so as to cause an abnormality of pressure in said circuit effective to operate the pressure-responsive means; actuating means operative in response to a predetermined extent of movement of one motor part relative to the other in said direction for actuating the second valve means from its first position to its second position and hence to effect return of the control valve to neutral via operation of said pressure-responsive means; and said actuating means including cooperative elements having provision for overrunning relative to the second valve means after actuation of said second valve means to its second position so that said second valve means is unaffected by subsequent re-positioning of the control valve toward its active position to effect fluid transmission through said circuit via said restricted passage for subsequent operation of the motor at a slower speed.

4. For an implement of the type including a supporting part and an implement part connected thereto for movement with respect thereto in at least one direction: fluid-pressure apparatus comprising a fluid motor having first and second parts provided with means for connection respectively to the implement and supporting parts and arranged for movement of one relative to the other in at least one direction to move the implement part as aforesaid; a source of fluid pressure having high and low sides; a fluid-pressure circuit connected to and including the fluid-pressure source and the motor for transmitting fluid pressure between the motor and the source; a control valve in the circuit selectively movable to a neutral position to cut out the circuit between the source and the motor or to an active position for establishing the circuit; pressure-responsive means in the circuit operative in response to abnormal fluid pressure in the circuit for diverting the fluid pressure to the low side of the fluid-pressure source; means connected between the pressure-responsive means and the control valve for returning the control valve from its active position to its neutral position in response to actuation of said pressure-responsive means; means including a second valve in the circuit actuatable from a first position conditioning the circuit for the supply of fluid to the motor at normal pressures, to a second position restricting said circuit to an extent sufficient to cause an abnormality of pressure therein effective to operate the pressure-responsive means; actuating means operative in response to a predetermined extent of movement of one motor part relative to the other in said direction for actuating the second valve means from its first position to its second position and hence to effect return of the control valve to neutral via operation of said pressure-responsive means; means including a restricted passage by-passing said second valve means and effective in response to actuation of said second valve means to its second position for conditioning the circuit for the subsequent restricted transmission of fluid between the motor and said source so that re-positioning of the control valve toward its active position is effective to again initiate operation of the motor whereby relative movement of said parts in said direction may be resumed at a slower speed because of said restricted passage; and said actuating means including cooperative elements having provision for overrunning relative to the second valve means after actuation of said second valve means to its second position so that said second valve means is unaffected by subsequent operation of the motor in said direction and at said slower speed.

5. A hydraulic motor assembly comprising: a first motor member including an interior cylinder chamber and first and second opposite ends, said first end having a central piston rod opening therethrough; a second motor member including a piston within the cylinder chamber having a piston rod extending outwardly through said opening; means on the first motor member including a fluid passage communicating with the cylinder chamber at the first-end side of the piston; second means on the first motor member providing a fluid passage communicating with the cylinder chamber at the second-end side of the piston, and including a first bore at said second end of the cylinder chamber disposed generally lengthwise as respects the cylinder chamber axis and a second bore transverse to and intersecting the first bore; valve means confined to said second end of the cylinder chamber and including a valve seat in said first bore, a valve shiftable in said first bore selectively between two positions for seating on or unseating from said valve seat, and a restricted fluid passage by-passing the valve seat and communicating said first bore and the cylinder chamber at the second-end side of the piston; spring means biasing the valve to one of its positions; a rockshaft in the second bore having an end portion proximate to the valve and provided with cam means engageable with said valve to effect shifting thereof, and having an opposite end portion external to the cylinder chamber and provided with an operating arm for effecting rocking of said rockshaft; and control means operative between the rockshaft-operating arm and the piston rod, including an elongated control element outside the cylinder chamber and shiftable lengthwise thereof and having a first end portion proximate to the first end of the cylinder chamber and a second end proximate to the second end of the cylinder chamber and engageable with the rockshaft-operating arm, and means engageable between said first end of the control element and the piston rod including an operating element on a part of the piston rod external to the cylinder chamber and so arranged that movement of the piston and rod toward the second end of the cylinder chamber effects movement of the control element in the same direction for effecting seating of the valve and establishing effectiveness of said by-pass passage, said control means including provision in one of its elements for lengthwise shifting of said one element relative to the rockshaft-operating arm to accommodate further movement of the piston and piston rod in the aforesaid direction after said valve is seated and fluid is transmitted through said by-pass passage.

6. A hydraulic motor assembly comprising: a cylinder having first and second opposite ends, said first end having a central piston rod opening therethrough; a piston within the cylinder having a piston rod extending outwardly through said opening; means on the cylinder including a fluid passage communicating with the cylinder at the first-end side of the piston; second means on the cylinder providing a fluid passage communicating with the cylinder at the second-end side of the piston, and including a first bore at said second end of the cylinder; valve means confined to said second end of the cylinder and including a valve seat in said first bore, a valve shiftable in said first bore selectively between two positions for seating on or unseating from said valve seat, and a restricted fluid passage by-passing the valve seat and communicating said first bore and the cylinder at the second-end side of the piston; spring means biasing the valve to one of its positions; a rockshaft journaled on the cylinder and having cam means proximate to and engageable with said valve to effect shifting thereof, and having an operating arm relatively remote from said valve for effecting rocking of said rockshaft; and control means operative between the rockshaft-operating arm and the piston rod, including an elongated control element shiftable lengthwise of the cylinder and having a first-end portion proximate to the first end of the cylinder and a second end proximate to the second end of the cylinder and engageable with the rockshaft-operating arm, and means engageable between said first end of the control element and the piston rod including an operating element on the piston rod and so arranged that lengthwise movement of the piston and rod in one direction effects lengthwise movement of the control element for effecting seating of the valve and establishing effectiveness of said by-pass passage, said control means including provision in one of its elements for lengthwise shifting of said one element relative to the rockshaft-operating arm to accommodate further movement of the piston and piston rod in the aforesaid direction after said valve is seated and fluid is transmitted through said by-pass passage.

7. A hydraulic motor assembly comprising: a cylinder having first and second opposite ends, said first end having a central piston rod opening therethrough; a piston within the cylinder having a piston rod extending outwardly through said opening; means on the cylinder including a fluid passage communicating with the cylinder at the first-end side of the piston; second means on the cylinder providing a fluid passage communicating with the cylinder at the second-end side of the piston, and including a first bore at said second end of the cylinder; valve means confined to said second end of the cylinder and including a valve seat in said first bore, a valve shiftable in said first bore selectively between two positions for seating on or unseating from said valve seat, and a restricted fluid passage by-passing the valve seat and communicating said first bore and the cylinder at the second-end side of the piston; means biasing the valve to one of its positions; and control means operative between the valve and the piston rod, including an elongated control element shiftable lengthwise of the cylinder and having a first-end portion proximate to the first end of the cylinder and a second end proximate to the second end of the cylinder and including a valve-engaging element, and means engageable between said first end of the control element and the piston rod including an operating element on the piston rod and so arranged that lengthwise movement of the piston and rod in one direction effects lengthwise movement of the control element for effecting seating of the valve and establishing effectiveness of said by-pass passage, said control means including provision in one of its elements for lengthwise shifting of said one element relative to the valve to accommodate further movement of the piston and piston rod in the aforesaid direction after said valve is seated and fluid is transmitted through said by-pass passage.

8. A hydraulic motor assembly comprising: a cylinder having first and second opposite ends, said first end having a central piston rod opening therethrough; a piston within the cylinder having a piston rod extending outwardly through said opening; means on the cylinder including a fluid passage communicating with the cylinder at the first-end side of the piston; second means on the cylinder providing a fluid passage communicating with the cylinder at the second-end side of the piston, and including a first bore at said second end of the cylinder; valve means confined to said second end of the cylinder and including a valve seat in said first bore, a valve shiftable in said first bore selectively between two positions for seating on or unseating from said valve seat, and a throttling fluid passage through said valve for by-passing the valve seat when the valve is seated; means biasing the valve to its unseated position; and control means operative between the valve and the piston rod, including an elongated control element shiftable lengthwise of the cylinder and having a first-end portion proximate to the first end of the cylinder and a second end proximate to the second end of the cylinder and including a valve-engaging element, and means engageable between said first end of the control element and the piston rod including an operating element on the piston rod and so arranged that lengthwise movement of the piston and rod in one direction effects lengthwise movement of the control element for effecting seating of the valve and establishing effectiveness of said by-pass passage, said control means including provision in one of its elements for lengthwise shifting of said one element relative to the valve to accommodate further movement of the piston and piston rod in the aforesaid direction after said valve is seated and fluid is transmitted through said by-pass passage.

EMIL F. JIRSA.

References Cited in the file of this patent

UNITED STATES PATENTS

| Number | Name | Date |
|---|---|---|
| 917,642 | McElroy | Apr. 6, 1909 |
| 2,223,792 | Muir | Dec. 3, 1940 |
| 2,243,364 | Trautman | May 27, 1941 |
| 2,335,809 | Stacy | Nov. 30, 1943 |
| 2,383,689 | Silver | Aug. 28, 1945 |
| 2,444,228 | Huthsing | June 29, 1948 |

FOREIGN PATENTS

| Number | Country | Date |
|---|---|---|
| 527,171 | Great Britain | Oct. 3, 1940 |